United States Patent

[11] 3,564,295

[72] Inventor Mathew A. Slaats
Jasper, Ind.
[21] Appl. No. 654,613
[22] Filed July 19, 1967
[45] Patented Feb. 16, 1971
[73] Assignee Kimball Piano & Organ Co.
Jasper, Ind.

[54] FREQUENCY DOUBLING CIRCUIT

8 Claims, 2 Drawing Figs.

[52] U.S. Cl. 307/261; 307/271; 328/20; 307/220
[51] Int. Cl. H03k 5/00
[50] Field of Search 321/4, 10; 328/26, 20; 307/261, 271

[56] References Cited

UNITED STATES PATENTS

| | | | |
|---|---|---|---|
| 3,044,004 | 7/1962 | Sicard | 321/69 |
| 3,054,068 | 9/1962 | DeJong | 330/24 |
| 3,089,966 | 5/1963 | Procter | 307/223 |
| 3,320,409 | 5/1967 | Larrowe | 235/197 |
| 3,330,973 | 7/1967 | Clapper | 307/262 |
| 3,411,066 | 11/1968 | Bravenec | 321/8 |

*Primary Examiner*—Donald D. Forrer
*Assistant Examiner*—Harold A. Dixson
*Attorney*—Melvin A. Crosby

ABSTRACT: The specification discloses a frequency doubling circuit in which the input side of the circuit receives alternating current and one half wave thereof is supplied to the output side of the circuit via a diode while the other half wave biases a transistor to conduction to supply a half wave to the output side of the circuit of the same polarity as the half wave supplied via the diode. A capacitor between the output side of the circuit and a load stage blocks direct current so the supply to the load stage is in the form of alternating current at double the frequency of the current supply to the input side of the circuit.

PATENTED FEB 16 1971 3,564,295

INVENTOR.
MATHEW A. SLAATS
BY
Melvin A. Crosby

FREQUENCY DOUBLING CIRCUIT

The present invention relates to frequency changing circuits and is particularly concerned with a frequency doubling circuit. Frequency changing circuits, including frequency doubling circuits, are known and can be utilized anywhere where it is desired for a higher frequency to be an exact multiple of the lower frequency. In musical instruments, for example, where tones are electrically produced, a tone an octave higher than another tone has twice the frequency. Normally, the musical tones are generated electrically by utilizing a high frequency generator and dividing the frequency to get successive tones in steps of an octave below the basic tone. However, the present invention provides an arrangement whereby a tone an octave higher than any given other tone can be produced. Other instances in which the frequency doubling circuit of the present invention can be employed will suggest themselves to those skilled in the art.

As mentioned, frequency changing circuits are known but heretofore have been relatively expensive and complex and somewhat unreliable with respect to producing successive half waves at the output which conform with each other as to shape and amplitude.

The present invention proposes an extremely simple but highly effective frequency doubling circuit in which a minimum of distortion of the wave form occurs, and wherein successive half waves are of the same configuration and amplitude.

The present invention proposes a frequency doubling arrangement which can be adjusted to accommodate for the resistance of the circuit or load being fed by the frequency doubling circuit, and also to compensate for variations in supply voltage.

More particularly still, the present invention proposes to employ a single transistor and a single diode in a frequency doubling circuit and operating in the aforesaid manner, whereby the circuit is extremely simple and inexpensive.

Figure 1:
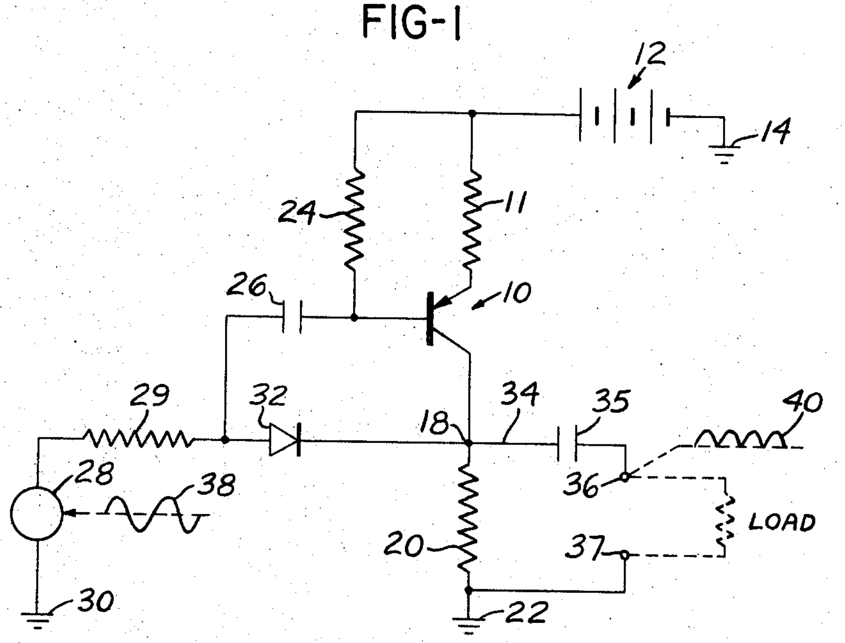
Figure 2:
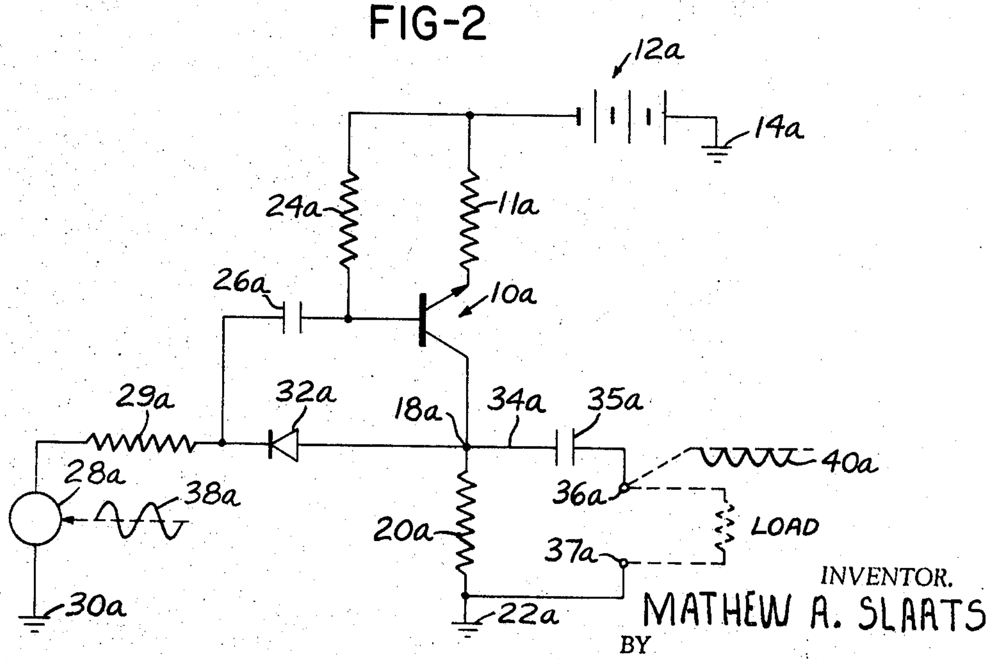

The nature of the present invention and the advantages thereof will become more apparent upon reference to the accompanying drawing in which:

FIG. 1 is a schematic showing of a PNP transistor in a frequency doubling circuit according to the present invention; and FIG. 2 is a schematic showing of an NPN transistor in a frequency doubling circuit according to the present invention.

Referring to the drawings somewhat more in detail, in FIG. 1, 10 represents a PNP transistor having its emitter connected via resistor 11 to the positive side of battery 12, the negative side of which is grounded at 14. The collector of transistor 10 is connected with a point 18, and point 18 is connected by resistor 20 with a ground point 22. The base of transistor 10 is connected by way of resistor 24 with the positive pole of battery 12 so that the transistor is normally biased to cutoff. The base of transistor 10, however, is also connected by way of a condenser 26 with one side of an alternating current voltage source 28, the other side of which is connected to ground point 30. The said one side of voltage source 28 is also connected via resistor 29 and diode 32 with point 18. Output line 34 leads from point 18 and is connected via condenser 35 with output terminal 36, between which and a second output terminal 37 connected to the grounded end of resistor 20, is the load 39.

In operation, transistor 10 is normally cut off by the bias transmitted thereto via resistor 24. During the half cycle of source 28, when the side of source 28 connected to diode 32 is positive, the diode is forwardly biased and passes current which flows down resistor 20 to ground point 22 and thus develops a positive potential at point 18.

When the source 28 has the side thereof connected to diode 32 negative, the diode is reversely biased and does not pass any current. However, the negative voltage of source 28 is transmitted through condenser 26 to the base of transistor 10 and the transistor goes conductive and current will flow from battery 12 through the collector emitter circuit of transistor 10, and through resistors 11 and 20 to ground point 22. Point 18 in this manner again goes positive. The input from source 28 is in the form of successive current alterations, as shown by the symbol at 38, whereas the output from point 18 supplied to line 34 is in the form of a series of successive half waves, as indicated by the symbol at 40. This series of successive half waves, which may be filtered, is related to a zero point intermediate its upper and lower peaks, and provides for a smooth alternating current wave which is twice the frequency of the alternating current supplied by source 28. Capacitor 35 provides for oscillation of the double frequency wave above and below a neutral, or zero, axis. The dashed line at the bottom of the double frequency wave shows that the wave is made up of a series of positive going half waves.

It will, furthermore, be evident that an adjustable resistor at 11 or 20 could be availed of for insuring that the voltage at point 18 will be the same on successive half cycles, the one half cycle being supplied from source 28, and the other half cycle being supplied from battery 12. Thus, if the voltage at source 28 varies, or if the resistance of the load 39 varies, the adjustable resistor can be adjusted to insure that the double frequency alternating current output wave is symmetrical as to the successive half cycles thereof. Resistor 20 is, of course, dependent in size on the load resistance, and represents the equivalent of the collector load resistance and the load resistance in parallel.

In FIG. 2 the same arrangement is shown and the same reference numerals are employed with the addition of a subscript *a*. In FIG. 2, however, transistor 10*i* is an NPN transistor so that battery 12*i* is reversed and likewise diode 32*i* is reversed and the output supplied to line 34*i*, as indicated by symbol 40*i*, is a succession of negative going half waves. These waves, when related to an axis intermediate the peaks, will provide a double frequency alternating current wave the same as that supplied by the circuit of FIG. 1. The only difference between the two circuits is that in FIG. 2 the negative half wave of source 28 is conveyed through diode 32 *a* while the positive half wave is blocked by diode 32*a* and, instead, makes transistor 10*i* conductive.

In practice, the impedance of condenser 26 is small relative to the resistance of resistor 29, and the resistance of the transistor. It can be shown that the successive half waves of the output will be equal, in an audio system, for an appreciable voltage of source 28, when the value of resistor 11 equals the sum of the values of resistors 29 and 20, when the latter represents the collector load resistance and the load resistance in parallel.

Instead of a PNP or an NPN transistor, a field effect transistor could also be employed in the circuit. It will, therefore, be understood that the term "transistor" in the claims is intended to include not only common transistors but also such other electronic components, such as field effect transistors having a control element and exhibiting unidirectional current flow characteristics.

The successive half waves of the output may be spaced slightly due to threshold voltages of the diode and transistor and their spacing may be a fairly large or it may be extremely small, depending on the values of the source and battery.

It will be understood that this invention is susceptible to modification in order to adapt it to different usages and conditions and, accordingly, it is desired to comprehend such modifications within this invention as may fall within the scope of the appended claims.

I claim:

1. In a frequency doubling circuit: a source of alternating current, a single transistor having a base and an emitter and a collector, a source of direct current connected between ground and the emitter of said transistor, resistance means connected between ground and the collector of said transistor, a biasing resistor connected between the emitter and the base of said transistor, one side of said alternating current source being connected to ground, a condenser having one side connected to the other side of said alternating current source and the other side connected to the base of said transistor, and a diode connecting the said other side of said alternating current source to a first point along said resistance means near said collector, a capacitor having one side connected to said first point, the other side of said capacitor and a second point along said resistance means near the ground forming output terminals for said circuit across which there is developed a frequency double that of the said alternating current source.

2. A frequency doubling circuit according to claim 1, in which said points are at the ends of said resistance means.

3. A frequency doubling circuit according to claim 2, which includes a second resistance means between the emitter of said transistor and said source of direct current.

4. A frequency doubling circuit according to claim 3, which includes a third resistance means between said first point and said source of alternating current.

5. A frequency doubling circuit according to claim 4, in which said transistor is a PNP transistor and the positive side of said direct current source is connected to the emitter of said transistor, and said diode is poled so as to be forwardly biased when the side of said source of alternating current which is connected to said diode goes positive.

6. A frequency doubling circuit according to claim 4, in which said transistor is an NPN transistor and the negative side of said direct current source is connected to the emitter of the transistor and said diode is poled so as to be forwardly biased when the side of said alternating current source which is connected to said diode goes negative.

7. A frequency doubling circuit according to claim 4, in which at least one of said resistance means is adjustable.

8. A frequency doubling circuit according to claim 4, in which said second resistance means has a value substantially equal to the sum of the values of said third resistance means and the said first mentioned resistance means.